United States Patent [19]

Milford

[11] Patent Number: 4,922,086
[45] Date of Patent: May 1, 1990

[54] WRITE HEAD APPARATUS FOR RECOGNIZING MAGNETIC CHARACTERS AND METHOD THEREFOR

[75] Inventor: Richard E. Milford, Oklahoma City, Okla.

[73] Assignee: BancTec, Inc., Oklahoma City, Okla.

[21] Appl. No.: 110,119

[22] Filed: Oct. 19, 1987

[51] Int. Cl.⁵ .............................................. G06K 7/08
[52] U.S. Cl. .................................. 235/449; 360/119; 382/7
[58] Field of Search ............... 235/449; 360/119, 120, 360/125, 126; 382/7

[56] References Cited

U.S. PATENT DOCUMENTS

| | | | |
|---|---|---|---|
| 2,985,298 | 5/1961 | Schreiner | 382/7 X |
| 3,152,225 | 10/1964 | Peters | 360/119 X |
| 3,638,238 | 1/1972 | Milford et al. | 340/146.3 |
| 3,978,450 | 8/1976 | Sanner et al. | 382/7 X |
| 4,239,151 | 12/1980 | Enser et al. | 235/449 X |
| 4,245,211 | 1/1981 | Kao | 382/7 |
| 4,805,058 | 2/1989 | Takeuchi et al. | 360/126 X |

Primary Examiner—David L. Trafton
Attorney, Agent, or Firm—Bill D. McCarthy

[57] ABSTRACT

A system for recognizing characters printed in magnetic ink on a document has a write head including a permanent magnet and soft iron pole pieces curving arcuately from opposite poles of the magnet to juxtaposed ends forming a gap underlying a curved, nonmagnetic cap along which a document is moved. The pole pieces are unequally magnetized to provide a component of magnetic induction normal to the upper surface of the cap that has opposite signs on opposite sides of the gap and differing peak values, the peak value to one side of the gap being in the range from 450 gauss to 650 gauss and the peak value on the other side of the gap being in the range from 200 gauss to 340 gauss.

9 Claims, 3 Drawing Sheets

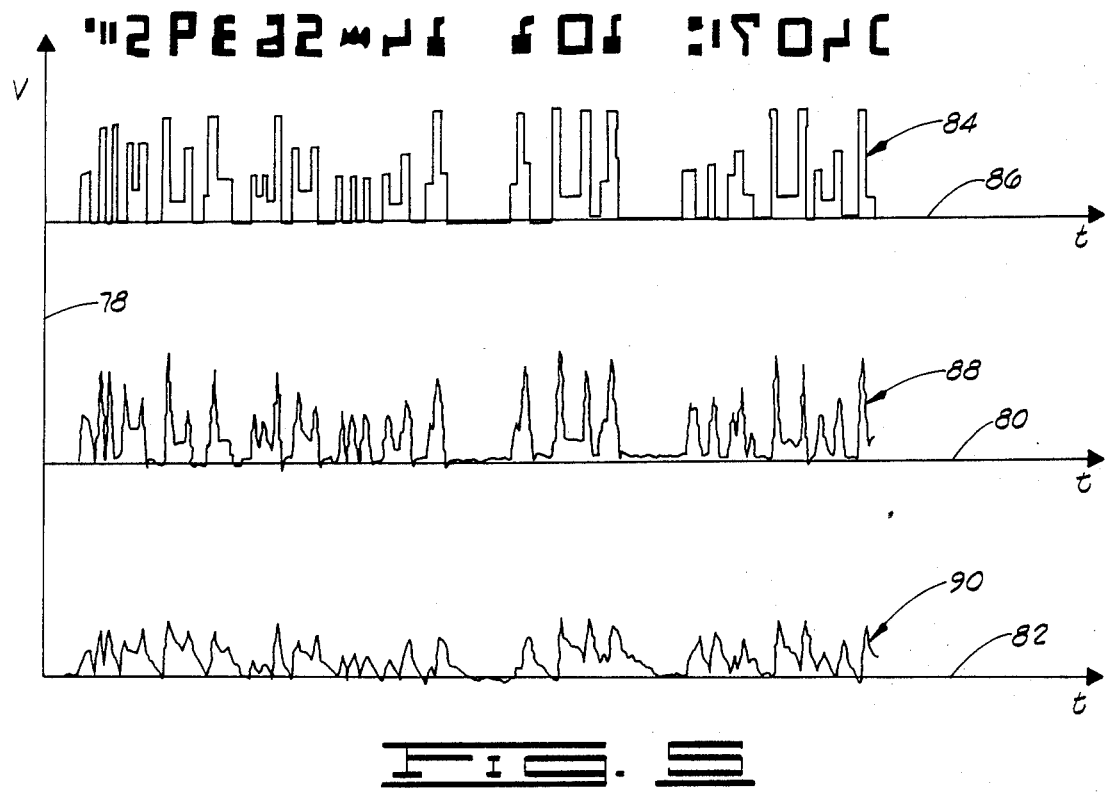
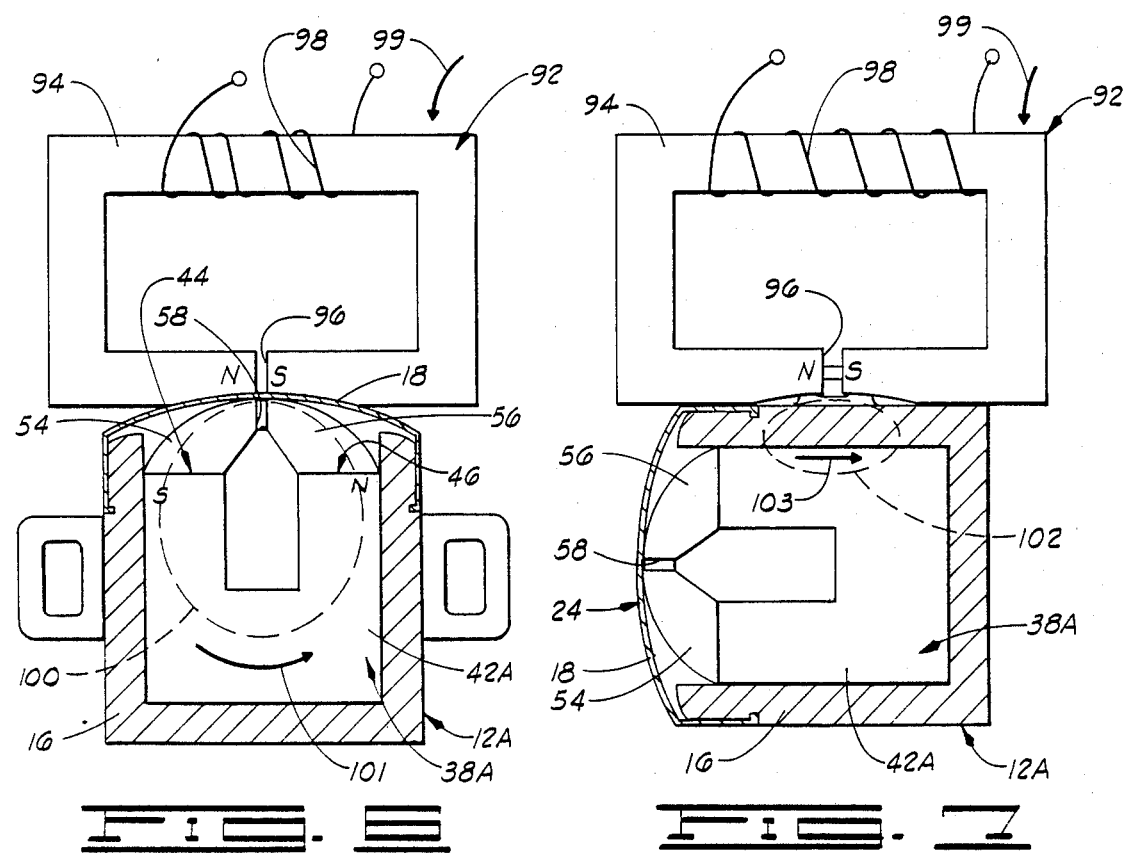

WRITE HEAD APPARATUS FOR RECOGNIZING MAGNETIC CHARACTERS AND METHOD THEREFOR

BACKGROUND OF THE INVENTION

1. Field of the Invention.

The present invention relates generally to improvements in apparatus and methods for recognizing characters printed in magnetic ink on documents, an more particularly but not by way of limitation, to improvements in write heads for apparatus of the designated type.

2. Brief Description of the Prior Art.

The automated recognition of characters printed in magnetic ink on documents of various types and for various purposes has been well developed in the years since the adoption of the digital computer as a standard business tool. For example, it is now common practice among banking institutions to provide customers with checks that have been imprinted with a customer identification number in magnetic ink so that the checks can be rapidly sorted by machine. Checks received by the bank are passed through a character recognition system which provides electrical signals to a computer which operates sorting apparatus. An example of a character recognition system has been disclosed in U.S. Pat. No. 3,638,238 issued Jan. 25, 1972 to Milford et al, the teachings of which are hereby incorporated by reference.

In general such systems are comprised of a write head that includes a permanent magnet and pole pieces curving toward each other from the poles of the magnet to form a gap about which a magnetic field exists so that characters on document can be magnetized by passing the document across the gap. The document is then passed across a read head which senses changes in magnetic flux caused by motion of the magnetized characters by the read head and generates electrical signals that can be decoded by appropriate circuitry for transmission to a computer.

As indicated in the referenced U.S. Pat. No. 3,638,238 printing imperfections can result in problems in the recognition of a number printed on a document, and such imperfections have, in the past, required the use of high quality printers for imprinting the characters on documents. In general, printers employing xerography have not been suitable for printing magnetic characters on documents, and attempts to use such printers have led to excessive reject rates for documents being sorted. While the quality of xerographic printing has improved with the advent of so-called laser printers, it has still not been possible to rely on xerographic printers as a means of printing magnetic characters on documents prior to sorting or other operation involving the recognition of the characters. Accordingly, it has not been possible to reduce the cost of preparing documents for such recognition to a level based on the advances that have occurred in xerographic printing techniques.

Summary of the Invention

The present invention solves these problems by providing an apparatus and method for recognizing magnetic characters, and an improved write head for such apparatus, in which the electrical signals generated by the read head closely approach ideal characteristics for such signals. In particular, the invention is based on the discovery that an asymmetry in the magnetic field produced by the write head results in the generation of signals by the read head for characters produced by laser xerography and ion deposition technology that can be readily identified by existing circuitry with substantially no error in the recognition of the characters.

Such asymmetry consists of a difference in the component of the magnetic induction normal to a document on which the characters are imprinted at the location of the characters. In particular, such component is larger at a leading side of the field, at which a document bearing magnetic characters enters the field, than at a trailing side of the field, from which the document exits the field. Thus, at the leading side, the peak value of the normal component of the magnetic induction is in the range from 450 to 650 gauss while the peak value at the trailing side, for which the sign of the normal component of the magnetic induction is reversed, is in the range from 200 gauss to 340 gauss.

In the application of this discovery, the invention utilizes an improved write head in which the asymmetry in the magnetic field is achieved by a corresponding asymmetry in magnetized portions of the write head. Thus, in one embodiment of the invention, the asymmetry in the magnetic field produced by the write head can be achieved by constructing a magnet assembly of which the write head is comprised to include a nonmagnetic lamina between one pole of a balanced permanent magnet and one of two soft iron pole pieces positioned atop the poles of the magnet and curving toward each other to the character magnetizing gap. Alternatively, the pole pieces can be positioned against the poles of the permanent magnet and the asymmetry can be achieved by asymmetrically magnetizing the pole pieces and portions of the permanent magnet adjacent the pole pieces.

Another object of the invention is to reduce the cost of imprinting documents with magnetic characters by providing a character recognition system and method capable of reliably distinguishing characters printed using laser or ion deposition technology.

Another object of the invention is to enhance reliability of magnetic character recognition by providing an improved write head for magnetizing characters imprinted on a document.

Other objects, advantages and features of the present invention will become clear from the following detailed description when read in conjunction with the drawing and appended claims.

BRIEF DESCRIPTION OF THE DRAWINGS

FIG. 5 is a graphical representation of a series of magnetized characters and electrical signals produced by read heads and integrating circuitry for such characters illustrating the effect of magnetic asymmetry on character recognition.

FIGS. 6 and 7 illustrate a second method of magnetizing a write head consistent with the present invention.

DESCRIPTION

Figure 1:
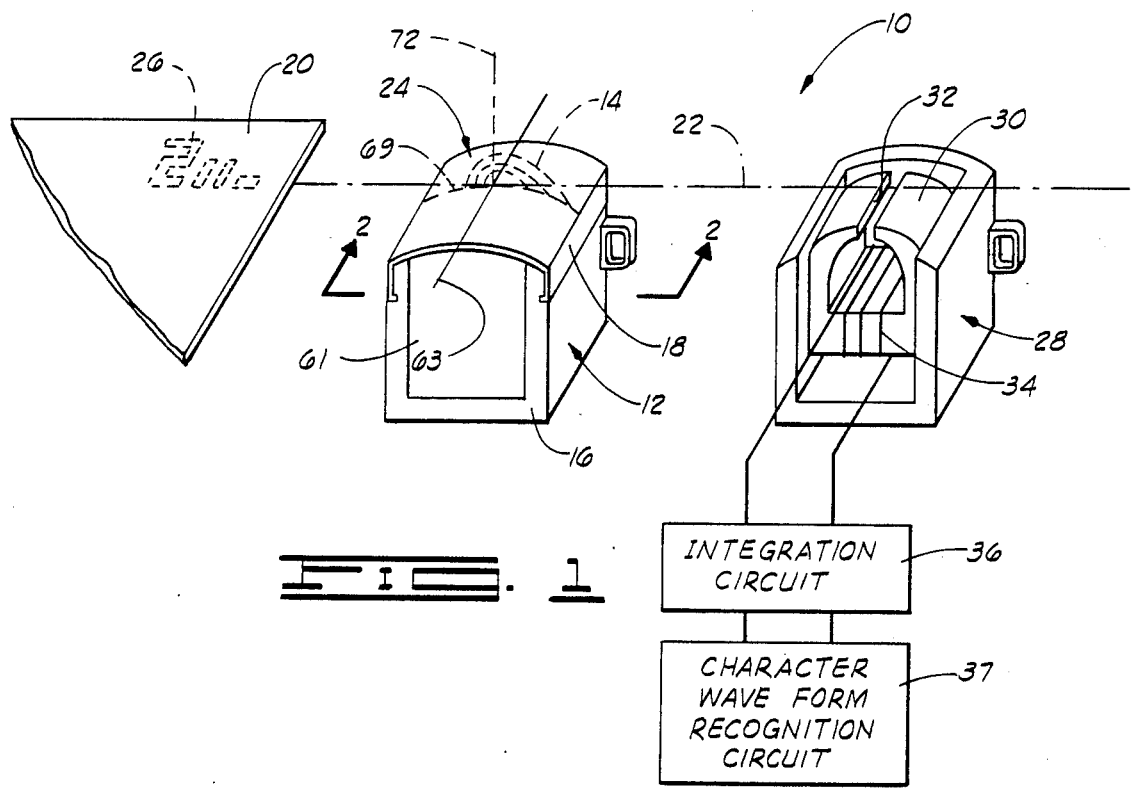
FIG. 1 is a stylized depiction of a character recognition system constructed in accordance with the present invention to include a write head magnetized in accordance with the invention.
Figure 2:
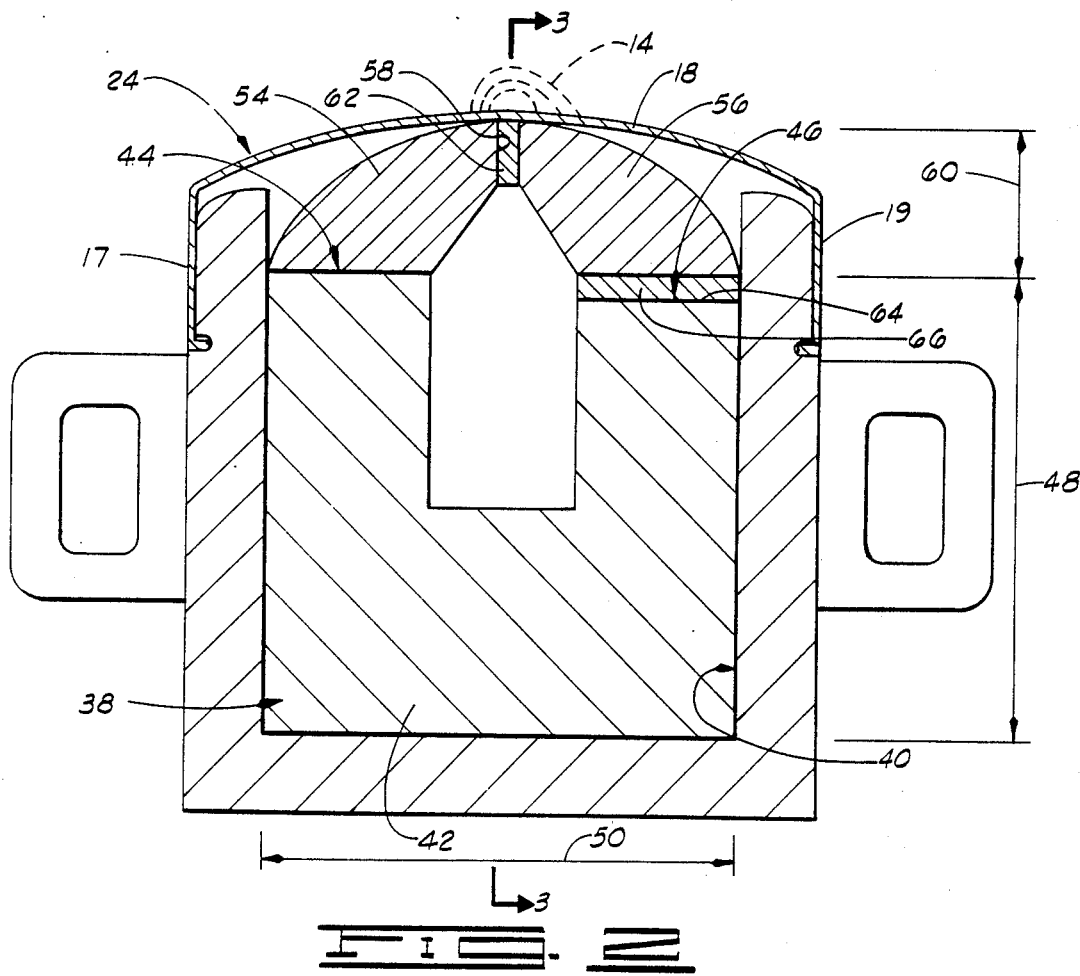
FIG. 2 is a cross section of a write head magnetized in accordance with the present invention taken along line 2—2 of FIG. 1.
Figure 3:
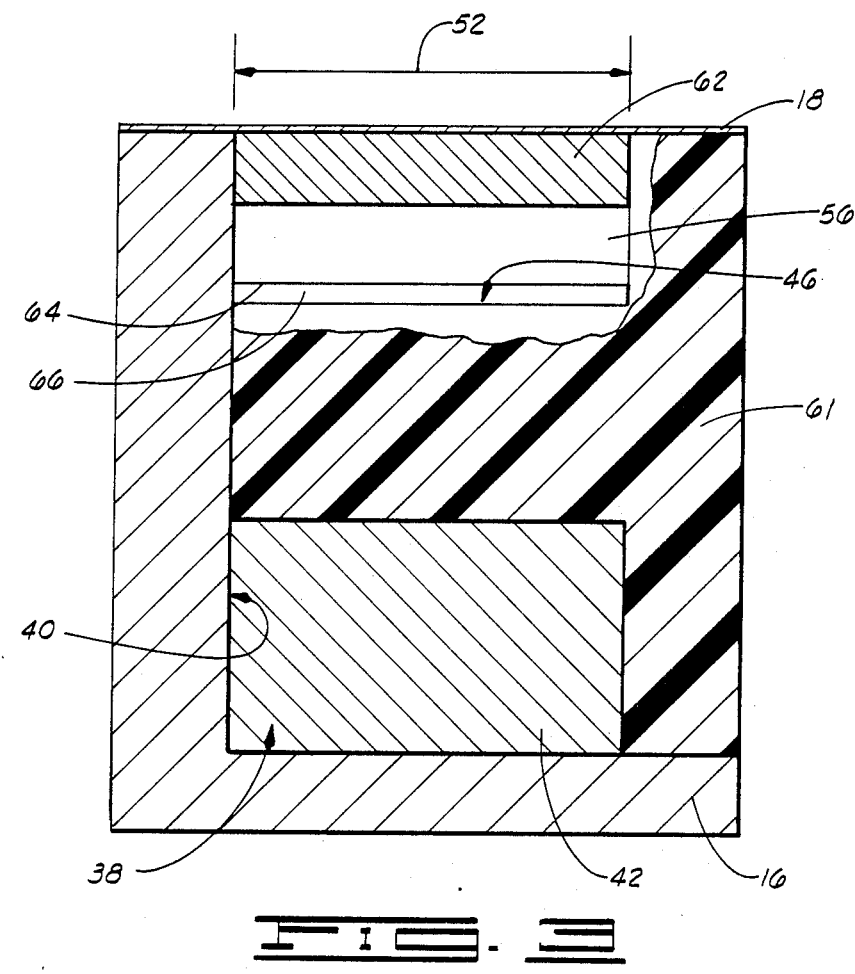
FIG. 3 is a cross section of the write head of FIG. 2 taken along line 3—3 of FIG. 2.

Referring now to the drawings, and more particularly to FIGS. 1 through 3, shown therein and designated by the general reference numeral 10 is a character recognition system constructed in accordance with the present invention to include a write head 12 that produces an asymmetric magnetic field as indicated by magnetic lines of force illustrated in dashed lines at 14 of FIGS. 1 and 2. (For purposes of illustration, the magnetic lines of force have been exaggerated in FIG. 1.)

As shown in the drawings, the write head is comprised of a case 16, constructed of a nonmagnetic alloy, and surmounted by a curved, stainless steel cap 18 that can be positioned to engage a document 20 that is moved through the system 10 along a document travel path indicated in dot-dash line at 22 in FIG. 1. (In one preferred embodiment of the write head 12 that will be specifically described herein for completeness of disclosure, the case 16 has substantially the form of a cube one inch on a side and the cap 18, which is substantially 0.025 inch thick, arches upwardly an additional eighth inch.) The upper surface 24 of the cap 18 thus forms a document engagement surface for the write head 12 that intersects the document travel path 22 and positions the document with respect to the magnetic field 14 in a manner to be discussed below. As indicated in FIGS. 1 and 2, the cap 18 can be secured to the case 16 by bending portions 17 and 19 at opposite edges of the cap 18 about upper portions of the case 16 and bending the portions 17 and 19 to form flanges received in grooves cut in two opposite sides of the case 16.

The present invention contemplates that characters 26, illustrated in dashed lines in FIG. 1, will be imprinted on the side of the document 20 that contacts the document engagement surface 24 (the underside of the document 20 in FIG. 1) so that passage of the document across the write head 12 will magnetize the characters 26 and the system 10 is further comprised of a conventional read head 28 in which is located a substantially toroidal iron core 30. The core 30 is interrupted by a gap 32 adjacent the document travel path 22 so that passage of magnetized characters by the read head 28 will produce a changing magnetic flux in the core 30. (For purposes of illustration, the width of the gap 32 has been exaggerated in FIG. 1. Additionally, a thin hard coating that is plated on the core 30 to extend across the gap and provide a wear resistant surface has not been illustrated in FIG. 1.) A coil 34 is wrapped about a portion of the core so that electrical signals indicative of the characters on the document 20 will be generated in the coil 34 in response to variations in the magnetic flux in the core 30. The coil 34 is electrically connected to a conventional integrating circuit 36 that receives signals induced in the coil 34 and produces signals substantially proportional to the magnetization of characters passing the gap 32. The output of the integrating circuit 36, in turn, is electrically connected to a conventional character waveform recognition circuit 37 for determining the sequence of characters on a document from the signals produced by the integrating circuit. A suitable integrating circuit and character waveform recognition circuit for use in the present invention has been disclosed in the above referenced U.S. Pat. No. 3,638,238.

Returning to the write head 12, and with particular reference to FIGS. 2 and 3, the write head 12 is further comprises of a magnet assembly 38 disposed in a cavity 40 formed in the case 16. (The cavity 40 can be formed by omitting the top and one side wall of the case 16 as has been illustrated.) The magnet assembly 38, in turn, is comprised of a C-shaped permanent magnet 42 which is magnetized such that opposite magnetic poles appear at the ends 44 and 46 of the C of the magnet 42. In the one preferred embodiment of the write head 12 referred to above, the magnet 42 is magnetized such that a south magnetic pole appears at the end 44 while a north magnetic pole appears at the end 46. In such embodiment, the height of the magnet, indicated at 48 in FIG. 2, is substantially about nine sixteenths inch, the width 50 of the magnet 42 is substantially three fourths inch, and the thickness 52 of the magnet 42 is substantially five eighths inch.

The magnet assembly 38 is further comprised of two soft iron pole pieces 54 and 56 that are positioned atop the ends 44 and 46 of the magnet 42 respectively, the pole pieces 54 and 56 curving upwardly to juxtaposed ends (not numerically designated in the drawings) that form a primary gap 58 immediately below central portions of the cap 18, portions of the pole pieces 54 and 56 adjacent the juxtaposed ends extending along the underside of the cap 18 for this purpose. In the preferred embodiment previously referred to herein, the pole pieces are substantially three sixteenths inch high, as indicated at 60 in FIG. 2, and the gap is 0.020 inch thick, such thickness being fixed by a piece 62 of brass shim stock positioned in the gap 58. Thus, the magnet assembly produces the magnetic field which has been indicated at 14 in FIGS. 1 and 2 and which extends through the cap 18 to curve over central portions thereof between the ends of the pole pieces 54 and 56. As indicated in FIGS. 1 and 3, once the magnet assembly 38 has been inserted into the case 16, spaces within the case 16 about the magnet assembly can be filled with a suitable potting compound 61 to fix the magnet assembly in the case 16.

In the practice of the present invention, the magnetic field produced by the magnet assembly 38 is caused to be asymmetric with respect to a null line, indicated at 63 in FIG. 1, that extends along central portions of the document engagement surface 24 perpendicularly to the document travel path 22 and substantially centered above the gap 58. In one method of producing such asymmetry, illustrated in FIGS. 2 and 3, the magnet 42 is substantially homogeneously magnetized so that the magnetization thereof is balanced to opposite sides of the primary gap 62 and a secondary gap 64 for the magnet assembly 38 is formed between the end 46 of the magnet 42 and the pole piece 56. In the one preferred embodiment referred to above, the secondary gap 64 has a thickness of substantially 0.060 inch and such thickness is established by a lamina 66, formed of a nonmagnetic material such as brass, interposed between the end 46 of the magnet 42 and the pole piece 56.

Figure 4:
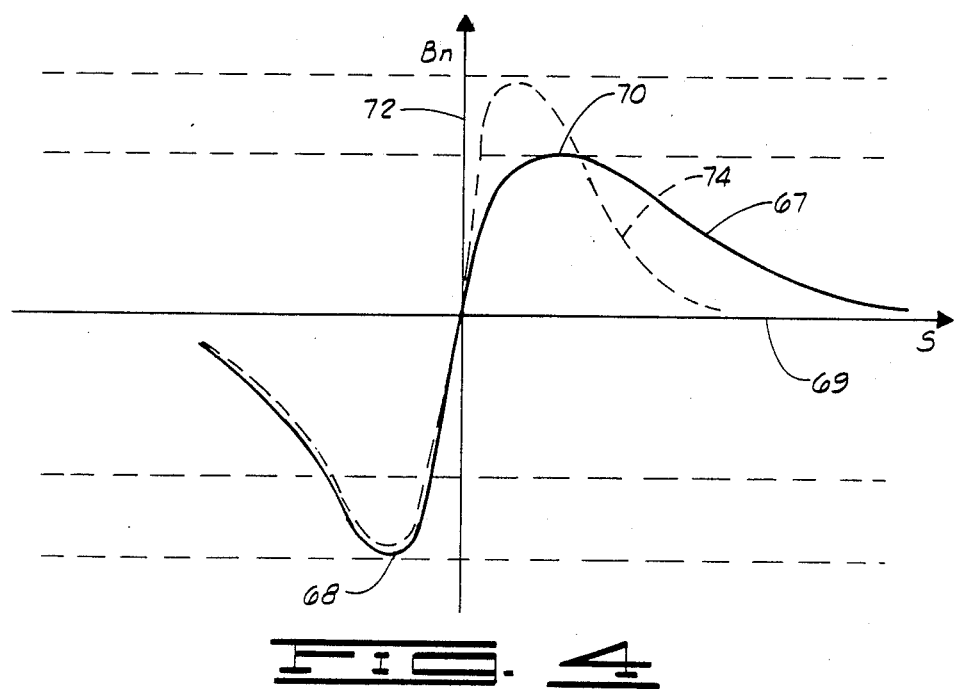
FIG. 4 is a graphical representation of the magnetic field produced by a write head magnetized in accordance with the present invention.

Description of FIGS. 4 and 5

As noted above, it has been found that an asymmetry in the magnetic field produced by the write head 12 along the document travel path 22 enhances the discrimination of different magnetic characters by the system 10 permitting xerographically produced characters to be distinguished thereby. For completeness of disclosure, such asymmetry has been schematically illustrated in FIG. 4 which presents a graph 67 of the component of the magnetic induction normal to the document engagement surface 24 along an arc, indicated in dashed line at 69 in FIG. 1, of the surface 24 extending substantially parallel to the document travel path 22. In particular, the normal component Bn at the surface 24 has been plotted as the ordinate in FIG. 4 and arc length S along the line 69 has been plotted as the abscissa with the origin of the graph being a point on the null line 63.

As shown in FIG. 4, the magnetic induction on the leading side of the write head 12; that is, the side to the left of the null line 63 in FIG. 1 and to the left of the origin in FIG. 4, is generally directed perpendicularly to the document engagement surface 24 and, in the practice of the invention, the component thereof normal to the document engagement surface 24 has a peak value, indicated at 68 in FIG. 4, in the range from 450 to 650 gauss. At the origin; that is, along the null line 63, the magnetic induction is parallel to the document engagement surface 24 so that the normal component of the magnetic induction at the origin of coordinates in FIG. 4 is zero. The normal component of the magnetic induction at the document engagement surface exhibits a second peak 70 on the trailing side of the write head 12; that is, the side to the right of the null line 63 in FIG. 1, as the magnetic induction again becomes directed substantially normally to the document engagement surface 24. In the practice of the invention, the peak 70 is caused to have a value in the range from 200 to 340 gauss and the normal component of the magnetic induction is caused to have an algebraic sign at the peak 70 that is opposite the algebraic sign of the normal component of the magnetic induction at the peak 68. Thus, for the one preferred embodiment of the write head 12 that has been described above, the sign the normal component of the magnetic induction on the leading side of the null line 63 and with respect to a coordinate system wherein the axis 72 extends along the outward normal to the document engagement surface 24 as shown for the center of the arc 69 in FIG. 1 and by the labelling of the axes in FIG. 4, the normal component of the magnetic induction is negative at the peak 68 and positive at the peak 70. Further, for such embodiment, the peaks 68 and 70 occur at positions displaced substantially one sixteenths inch to the sides of the null line 64. For purposes of comparison, a typical magnetic profile for a conventional write head has been indicated in dashed line at 74 in FIG. 4.

FIG. 5, to which attention is now invited, has been included to illustrate the effect of the asymmetric magnetic induction on the capacity of the system 10 to distinguish magnetic characters imprinted on a document using ion deposition technology. In particular, a string of characters imprinted on a test document with an ion deposition printer has been reproduced at 76 at the top of FIG. 5 and plots of the output voltage, on the ordinate 78, of the integrating circuit 36 versus time, on the abscissas 80 and 82 resulting from passage of the test document by a read head following magnetization of the characters with a write head constructed in accordance with the present invention and a conventional write head have been presented in lower portions of FIG. 5.

For comparison purposes, the ideal voltage output of the integrating circuit 36 for the characters 76 has been illustrated as a function of time at 84 on time axis 86. The plot 88 is a reproduction of a logic analyzer trace of the output of the integrating circuit 36 following magnetization of the characters on the test document using a write head constructed in accordance with the present invention to subject the characters to an asymmetric magnetizing field. The plot 90, on zero voltage line 92, is a reproduction of a logic analyzer trace of the output of the same integrating circuit 36 following magnetization of the characters on the same test document using a conventional write head to subject the characters to a magnetic field having the balanced characteristics illustrated at 74 in FIG. 4.

As is clearly shown in these plots, ion deposition printing of the characters resulted in severe degradation of the signals obtained from a read head and integration circuit following magnetization using a conventional write head. On the other hand, such degradation was substantially eliminated by magnetizing the characters using a asymmetric magnetic field as taught by the present invention.

Description of FIGS. 6 and 7

FIGS. 6 and 7, to which attention is now invited, illustrate another method of magnetizing a write head 12A to obtain the asymmetric magnetic field therefor utilized to magnetize magnetic characteristics in accordance with the present invention. In the write head 12A, the magnet assembly 38A is comprised only of a C-shaped magnet 42A, that differs structurally from the magnet 42 in that the magnet 42A is structurally symmetric about the gap 58, and pole pieces 54 and 56 that are structurally identical to the pole pieces of the write head 12 and are positioned with respect to each other as in the magnet assembly 38. (For purposes of illustration, the width of the gap 58 has been exaggerated in FIGS. 6 and 7.) In the write head 12A, the asymmetric magnetic characteristics are obtained when the magnet assembly 38A is magnetized as will now be described.

Following assembly of the magnet assembly 38A, mounting of the assembly 38A in the case 16, which is identical to the case of the write head 12, and potting, an electromagnet 92, having a toroidal core 94, interrupted by a gap 96, and a coil 98, is positioned against the write head 12A such that the primary gap 58 between the pole pieces 54 and 56 is aligned with the gap 96 in the core 94 of the electromagnet 92 as shown in FIG. 6. With the electromagnet and write head 12A so positioned, an electric current is passed through the coil 98 in the direction indicated by the arrow 99, to generate a magnetizing field, indicated in dashed lines at 100 in FIG. 6, in the magnet assembly 38A, the magnetic induction having the direction indicated at 101 in FIG. 6. (For purposes of illustration, FIG. 6 has been drawn for the case in which a north magnetic pole is formed on the end 46 of the magnet 42A adjacent the pole piece 56.)

Following the initial magnetization of the magnet 42A, the electromagnet 92 is repositioned to engage the side of the write head 12A, adjacent the north magnetic pole formed on the magnet 42A and the electromagnet 92 is again energized by a current in the direction 99 to generate a demagnetizing field indicated at 102 in FIG. 7. Specifically, the electromagnet 92 is oriented with respect to the magnet assembly 38A to cause the magnetic induction in portions of the magnet assembly 38A adjacent the gap 96 to have the direction shown by the arrow labelled 103 in FIG. 7, that is, in a direction opposite to the initially applied field. Thus, energization of the electromagnet 92 will result in partial demagnetization of portions of the magnet 42A adjacent the pole piece 56 and the pole piece 56 so that the pole pieces will be asymmetrically magnetized to produce the desired asymmetric magnetic field along the document engagement surface 24.

Operation of the Character Recognition System

The operation of the character recognition system 10 is similar to the operation of conventional systems of the type in that a document bearing characters printed in magnetic ink is passed along the document travel path 22 to sequentially engage the document engagement surface 24 on the write head 12 and then engage portions of the read head 28 adjacent the gap 32 in the core 30 thereof. However, a significant difference between the operation of the system 10 and prior art systems is provided by the asymmetric magnetization of the pole pieces 54 and 56. Specifically, in contrast to prior art systems in which portions of a document whereon the characters are printed are passed through a magnetic field which has substantially equal peak values of the normal component of magnetic induction on opposite sides of the null line 64, such portions of the document are sequentially passed through a first portion of the magnetic field of the write head 12, at the leading side of the write head 12, wherein the peak value of the component of the magnetic induction normal to the plane of the document is in the range from 450 to 650 gauss, then through a second portion of the magnetic field, at the trailing side of the write head 12, wherein such component of the magnetic induction has an opposite sign and a peak value in the range from 200 to 340 gauss.

Thereafter, the document is passed over the read head to generate electrical signals indicative of the magnetization of the characters resulting from the passage of the document through the magnetic field of the write head and such signals are transmitted to the integrating circuit 36 and character waveform recognition circuit 37 for determination of the characters on the document to permit further processing of the document or information thereon.

It will be clear that the present invention is well adapted to carry out the objects and attain the ends and advantages mentioned as well as those inherent therein. While presently preferred embodiments have been described for purposes of this disclosure, numerous changes may be made which will readily suggest themselves to those skilled in the art and which are encompassed within the spirit of the invention disclosed and as defined in the appended claims.

What is claimed is:

1. A system for recognizing a sequence of characters printed in magnetic ink on a document moving along a preselected document travel path, comprising:
    a write head having a document engagement surface formed thereon to extend along said path, wherein the write head comprises means for producing a magnetic field at the document engagement surface characterized in that the component of the magnetic induction normal to the document engagement surface at said surface varies along the direction of travel for the document from a peak value in the range of 450 to 650 gauss on one side of a null line, at which the normal component of the magnetic induction vanishes, to a peak value of opposite sign in the range of 200 gauss to 340 gauss whereby ink on the document is magnetized by traversal of the write head;
    read head means positioned along said document travel path downstream of the write head for generating electrical signals in response to passage of magnetized ink across the read head means; and
    integrating means electrically connected to the read head means for producing electrical waveforms indicative of the magnetization of the ink in which the characters is printed; and
    means connected to the integrating means for determining the sequence of characters printed on the document from said electrical waveforms.

2. The system of claim 1 wherein the means for producing a magnetic field at the document engagement surface comprises:
    a C-shaped permanent magnet magnetized such that opposite poles are formed at the ends of the C, wherein the permanent magnet is positioned with respect to the document engagement surface such that the ends of the C underlie portions of the document travel path to opposite sides of the null line on the document engagement surface; and
    two soft iron pole pieces mounted atop the ends of C of the permanent magnet, the pole pieces extending arcuately from the permanent magnet to juxtaposed ends forming a gap underlying the null line on the document engagement surface; and
wherein the pole pieces are unequally magnetized to provide said ranges of the normal component of the magnetic induction along tee document engagement surface.

3. The system of claim 2 wherein the means for producing a magnetic field at the document engagement surface further comprises a lamina of nonmagnetic material interposed between the end of said C underlying portions of the document travel path downstream of the null line and the pole piece mounted thereon.

4. A method for magnetizing characters printed in magnetic ink on a planar document, comprising the steps of:
    passing portions of the document whereon the characters are printed through a first portion of a magnetic field wherein the peak value of the component of magnetic induction normal to the plane of the document is in the range from 450 gauss to 650 gauss; and
    subsequently passing said portions of the document through a second portion of the magnetic field wherein the peak value of the component of magnetic induction normal to the plane of the document is in the range from 200 gauss to 340 gauss and has a sign opposite the sign of said component in the first portion of the magnetic field.

5. An improved write head for a magnetic character recognition system, comprising:
    means for forming a document engagement surface engageable with portions of a document whereon magnetic characters are printed in magnetic ink; and
    means for producing a magnetic field at the document engagement surface characterized in that the component of the magnetic induction normal to the document engagement surface at said surface has opposite signs on opposite sides of a null line on said surface at which said component vanishes, wherein the peak value of said component of the magnetic induction is in the range from 450 to 650 gauss on one side of the null line, and wherein the peak value of said component of the magnetic induction is in the range from 200 gauss to 340 gauss on the opposite side of the null line.

6. The write head of claim 1 wherein the means for producing a magnetic field at the document engagement surface comprises:
   a C-shaped permanent magnet magnetized such that opposite poles are formed at the ends of the C, wherein the permanent magnet is positioned with respect to the document engagement surface such that the ends of the C underlie portions of the document engagement surface to opposite sides of the null line on the document engagement surface; and
   two soft iron pole pieces mounted atop the ends of C of the permanent magnet, the pole pieces extending arcuately from the permanent magnet to juxtaposed ends forming a gap underlying the null line on the document engagement surface; and
wherein the pole pieces and portions of the magnet to opposite sides of the gap are unequally magnetized to provide said ranges of the normal component of the magnetic induction along the document engagement surface.

7. The write head of claim 6 wherein the means for producing a magnetic field at the document engagement surface further comprises a lamina of nonmagnetic material interposed between one of the ends of said C and the pole piece mounted atop said end of the C.

8. A magnet assembly for a write head in a character recognition system, comprising:
   a C-shaped permanent magnet magnetized to form opposite magnetic poles at the ends of the C;
   a nonmagnetic lamina mounted on one of the ends of the C of the permanent magnet; and
   two soft iron pole pieces, one pole piece mounted on the lamina on said one of the ends of the C of the permanent magnet and the other pole piece mounted on the other end of the C of the permanent magnet, the pole pieces curving away from the ends of the magnet to juxtaposed end forming a gap between the pole pieces.

9. The magnet assembly of claim 8 wherein portions of the magnet to opposite sides of the gap are substantially equally magnetized.

* * * * *

UNITED STATES PATENT AND TRADEMARK OFFICE
CERTIFICATE OF CORRECTION

PATENT NO. : 4,922,086

DATED : May 1, 1990

INVENTOR(S) : Richard E. Milford

It is certified that error appears in the above-identified patent and that said Letters Patent is hereby corrected as shown below:

Column 1, line 34, delete "on document" and substitute --on a document--.
Column 4, line 1, delete "comprises" and substitute --comprised--.
Column 8, line 6, delete "is" and substitute --are--. Column 8, line 27, delete "tee" and substitute --the--.

Signed and Sealed this

First Day of October, 1991

Attest:

HARRY F. MANBECK, JR.

*Attesting Officer*     *Commissioner of Patents and Trademarks*